United States Patent [19]

Muenster et al.

[11] 4,301,266

[45] Nov. 17, 1981

[54] MANUFACTURE OF POLYMERS OF ACRYLIC ACID OR METHACRYLIC ACID

[75] Inventors: Alfred Muenster, Ludwigshafen; Michael Rohmann, Bad Durkheim, both of Fed. Rep. of Germany

[73] Assignee: BASF Aktiengesellschaft, Fed. Rep. of Germany

[21] Appl. No.: 965,264

[22] Filed: Dec. 1, 1978

[30] Foreign Application Priority Data

Dec. 22, 1977 [DE] Fed. Rep. of Germany ....... 2757329

[51] Int. Cl.$^3$ .......................... C08F 2/06; C08F 2/10; C08F 2/38; C08F 20/06
[52] U.S. Cl. ................................. 526/212; 260/465.4; 526/317; 526/318; 526/912; 560/190; 562/565; 562/595; 526/307.6
[58] Field of Search ....................... 562/595, 565, 590; 560/190; 260/465.4; 526/212, 912, 303, 317, 318

[56] References Cited

FOREIGN PATENT DOCUMENTS 1139430 1/1969 United Kingdom ................ 562/595

*Primary Examiner*—Vivian Garner
*Attorney, Agent, or Firm*—Keil & Witherspoon

[57] ABSTRACT

An improved process for the production of polymers of acrylic acid or methacrylic acid by polymerizing acrylic acid or methacrylic acid in isopropanol or in a water-isopropanol mixture containing at least 40% by weight of isopropanol in the presence of polymerization initiators at a temperature of from 120° to 200° C. under pressure. The polymers obtained are used as dispersing agents for inorganic pigments.

5 Claims, No Drawings

MANUFACTURE OF POLYMERS OF ACRYLIC ACID OR METHACRYLIC ACID

The present invention relates to a process for the manufacture of polymers of acrylic acid or methacrylic acid or of mixtures thereof, which may contain up to 10% by weight of copolymerized units of a comonomer, by polymerizing the monomers in a solvent by means of a free radical polymerization initiator at an elevated temperature, under pressure.

German Pat. No. 655,570 discloses that acrylic acid and esters thereof can be polymerized by means of free radical polymerization initiators at elevated temperatures in solvents and diluents, for example acetone, ethyl acetate, benzene, alcohol, carbon tetrachloride, chloroform, ether, gasoline or water. According to the disclosure of the said Patent, the polymerization can also be carried out with simultaneous use of heat and pressure. According to the Examples given in the Patent, the polymerization has not been carried out at above 100° C.

To manufacture acrylic acid polymers of low molecular weight, acrylic acid can, according to British Pat. No. 1,139,430, be polymerized in a mixture of isopropanol and water in the ratio of 1:1, under atmospheric pressure. However, if attempts are made to scale up the polymerization of acrylic acid in mixtures of isopropanol and water, which is easily controllable in the laboratory, to an industrial scale, the polymers obtained exhibit serious variations in properties from one polymerization batch to another. Low molecular weight acrylic acid polymers which are manufactured in pure isopropanol or in solvent mixtures of water and isopropanol are in the main used as dispersants for inorganic pigments. The properties of dispersants manufactured by polymerizing acrylic acid on an industrial scale cannot be made reproducible by appropriate selection of the reaction conditions, e.g., the acrylic acid concentration, changing the solvent or varying the amount of peroxide.

It is an object of the present invention to improve the process described at the outset so as to permit the manufacture of low molecular weight polymers with reproducible properties even on an industrial scale.

We have found that this object is achieved, according to the invention, by using, as the solvent, isopropanol or a mixture of water and isopropanol containing at least 40% by weight of isopropanol, and carrying out the polymerization at from 120° to 200° C., under pressure.

The process according to the invention gives low molecular weight polymers which are used as dispersants for inorganic pigments and which, surprisingly, can be manufactured with excellently reproducible properties even on an industrial scale. The K values of the non-neutralized polymers are from 7 to 15. They were determined by the method of Fikentscher in a 1% strength aqueous solution at 25° C.

The process according to the invention is used for polymerizing acrylic acid, methacrylic acid or mixtures of these. Acrylic acid and methacrylic acid can be copolymerized in any desired ratio; they can also be copolymerized with other ethylenically unsaturated comonomers. Examples of suitable comonomers are esters of acrylic acid or of methacrylic acid, dicarboxylic acids, e.g., fumaric acid or maleic acid, monoesters or diesters of the said dicarboxylic acids, acrylonitrile, methacrylonitrile, acrylamide and methacrylamide. The amount of comonomer is selected so that water-soluble polymers are obtained or the polymers dissolve in alkali. The amount of the comonomers, of which one or more may be present, is up to 10% by weight. Preferably, however, the process according to the invention is used for the manufacture of acrylic acid homopolymers.

The polymerization is initiated by means of conventional free radical polymerization catalysts, e.g., hydrogen peroxide or potassium or sodium peroxydisulfate, or organic initiators, e.g., benzoyl peroxide, hydrogen peroxide being preferred. Bis-azo-diisobutyronitrile and others either exhibit an insufficient effect or insufficient solubility, or cause discoloration of the polymer solutions; they can therefore only be used with reservations.

The solvent used can be either pure isopropanol or a mixture of water and isopropanol containing at least 40% by weight of the latter. Isopropanol acts as a polymerization regulator but must be present in an amount of at least 40% by weight in the solvent mixture if low molecular weight polymers are to be manufactured. Another way of manufacturing low molecular weight polymers is to use a larger amount of polymerization initiator for the polymerization. Hydrogen peroxide, the preferred catalyst, is employed in an amount of from 0.2 to 5% by weight, based on the monomers, and calculated as 100% strength hydrogen peroxide. Preferably, amounts of from 1.0% to 2.0% of hydrogen peroxide (calculated as 100% strength) are used. A further increase offers only very slight advantages, whilst at concentrations of less than 1.0% the K value increases, resulting in a reduction in effectiveness of the product as a dispersant.

As a rule, the polymerization is carried out by first mixing a part of the acrylic acid, a part of the water/isopropanol mixture, and the polymerization initiator, then heating the reaction mixture under pressure to a temperature in the range from 120° to 200° C., and starting the polymerization. Thereafter, solvent, acrylic acid and polymerization initiator are added either continuously or batchwise. To obtain polymers with reproducible properties it is, however, important to carry out the polymerization at from 120° C. to 200° C. under pressure. The pressure is from about 2 to 20 bar, depending on the reaction temperature, but can also be higher. When all the monomer mixture has been introduced into the polymerization vessel, the reaction mixture is heated for a further 2–3 hours to a temperature within the stated range, and the pressure in the polymerization vessel is then lowered, a mixture of isopropanol and water distilling off at the same time. The remaining isopropanol and water are removed from the reaction mixture either at atmospheric pressure or, preferably, under reduced pressure. The distillation is discontinued when very little, if any, isopropanol remains in the reaction mixture. Advantageously, the pressure is lowered slowly, after the reaction has ended, until it reaches atmospheric pressure, during which stage a large proportion of the isopropanol/water mixture distils off. The pressure in the reaction vessel is then slowly reduced, with continued stirring, until the greater part of the isopropanol has passed over, together with water. Water, followed by aqueous sodium hydroxide solution, is then added to the residue, giving an aqueous solution of a sodium poly-salt. Instead of sodium hydroxide solution, potassium hydroxide solution, ammonia or amines can also be used. The pH of the poly-salt solution is as a rule brought to 8.0–9.0. The K value of the polymer salt is from 15 to 25.

In a preferred embodiment of the process according to the invention, the solvent mixture which is distilled from the reaction mixture after the polymerization has ended is reused in a subsequent polymerization. The solvent mixture can be recovered, and reused, as often as desired. It is merely necessary to compensate for slight losses of isopropanol by adding fresh isopropanol.

The low molecular weight polymers obtained by the process according to the invention are in the main used as dispersants for inorganic pigments, e.g., in the manufacture of paper coating compositions. From 0.1 to 5% by weight of the polyacrylate, based on pigment, is employed for this purpose.

The Examples which follow illustrate the invention. The K values were measured by the method of H. Fikentscher, Cellulosechemie 13 (1932), 48–64 and 71–74, in 1% strength aqueous solution at 25° C.; $K = k \cdot 10^3$.

EXAMPLE 1

1,600 kg of 58% strength aqueous isopropanol and 96 kg of 50% strength hydrogen peroxide are introduced into a pressure vessel of 15 m³ capacity, equipped with a stirrer, a heating jacket, and metering and distillation fitments. The mixture is heated to 130° C., the pressure being 4 bar. As soon as 130° C. is reached, a mixture of 5,000 kg of acrylic acid and 3,700 kg of 58% strength aqueous isopropanol are fed into the pressure vessel in the course of 6 hours from a stock vessel which is under appropriate pressure. At the same time, but over 8 hours, a total of 200 kg of 50% strength hydrogen peroxide is fed into the reactor by means of a metering pump. During the polymerization, the reaction mixture is kept at 130° C., the pressure being about 4 bar. When all the hydrogen peroxide has been added, the reaction mixture is kept at 130° C. for a further 2 hours and is then let down, in the course of which about 40% of the isopropanol/water mixture distil off through a condenser. The remaining isopropanol/water mixture is distilled off under reduced pressure. A ready-to-use solution of a sodium polyacrylate is obtained by adding water and 50% strength aqueous sodium hydroxide solution to the residue in the distillation vessel. The pH of the polyacrylate solution is 8.5 and the solution contains about 45% by weight of sodium polyacrylate. The K value of the free polyacrylic acid is 11.8, whilst that of the neutralized solution is 17.2.

The solution of the sodium salt of the polymer is used as a dispersant for the manufacture of paper-coating compositions; the dispersant proves to be extremely effective.

EXAMPLE 2

The solvent mixture distilled off in Example 1 was reused in a subsequent polymerization carried out under the same conditions as described in Example 1. The only modification of the recovered solvent mixture was to add 300 liters of isopropanol to compensate for the amount of isopropanol lost. In this Example, the K value of the polyacid was 11.0, and was thus below the value mentioned in Example 1. The K value of the neutralized polyacid was 15.8. On testing the neutralized solution as a dispersant for the manufacture of paper-coating compositions, excellent results were again obtained.

The solvent mixture was used for further production batches. After 15 batches, the distillate was examined. It contained 47.3% by weight of isopropanol, 28.2% by weight of water and 24.5% by weight of unidentified compounds. It was not possible to separate the solvent mixture by distillation, since several fractions of progressively increasing boiling points were obtained without any indication of a sharp separation. A proportion of the higher-boiling fraction was insoluble in pure water. Surprisingly, the complete solvent mixture obtained after 15 batches has as good a regulating action as pure isopropanol or as mixtures of isopropanol and water containing at least 40% by weight of isopropanol.

The reproducibility remains unchanged even after 50, 100 or more successive batches, with constant reuse of the isopropanol/water mixture distilled off.

COMPARATIVE EXAMPLE 1

The polymerization vessel of 15 m³ capacity, described in Example 1, is equipped with a reflux condenser. A mixture of 1,600 kg of 58% strength aqueous isopropanol and 96 kg of 50% strength hydrogen peroxide is introduced as described in Example 1, and heated to the boil (about 83° C.), whilst stirring. A mixture of 5,000 kg of acrylic acid and 3,700 kg of 58% strength aqueous isopropanol is then added continuously in the course of 6 hours; furthermore, 200 kg of 50% strength hydrogen peroxide are metered into the polymerization vessel at a uniform rate over 8 hours, through a separate feedline. The polymerization is carried out with the reaction mixture boiling under reflux. When all the hydrogen peroxide has been added, the mixture is boiled for a further 2 hours and the solvent mixture is then distilled off under reduced pressure, as described in the preceding Examples, until hardly any isopropanol remains in the reaction mixture. Water is then introduced and about 4,500 kg of 50% strength aqueous sodium hydroxide solution are added in the course of 2 hours, so as to give a pH of 8.6.

The K value of the acid is 16.5 and the K value of the poly-salt obtained on neutralizing the solution is 28.0. In contrast, in a laboratory experiment using a 2 liter polymerization vessel, the K value of the acid is 11.3 and the K value of the neutralized polymer is 16.5.

If the neutralized polyacrylic acid obtained as described in Comparative Example 1 is used as a dispersant for the manufacture of paper-coating compositions, it is found that these polymer solutions are far from being as effective as those of Examples 1 and 2. About 100% more polymer must be employed to achieve the same dispersing effect as with a polymer obtained according to Example 1.

COMPARATIVE EXAMPLE 2

Comparative Example 1 is repeated except that the solvent which was distilled off in Comparative Example 1 is reused and the loss of isopropanol is compensated by adding 200 liters of isopropanol. This procedure was subsequently repeated 3 more times. The results are summarized in the Table.

TABLE

| Comparative Example 2 | K value of the polyacrylic acid | K value of the neutralized polyacrylic acid |
|---|---|---|
| (a) | 16.5 | 28.0 |
| (b) | 17.2 | 28.8 |
| (c) | 17.8 | 30.0 |
| (d) | 18.3 | 30.8 |

In each case, about 70%–100% more dispersant is needed for the dispersion of pigments in the manufacture of paper-coating compositions as is the case when using a sodium polyacrylate manufactured as described in Example 1. Further, it is found that the K value alone is not the sole deciding factor for achieving optimum effectiveness.

We claim:

1. In the process for the production of low molecular weight water soluble polymers of acrylic or methacrylic acid by polymerizing acrylic acid or methacrylic acid with up to 10% by weight of a comonomer selected from the group consisting of esters of acrylic acid or of methacrylic acid, fumaric acid, maleic acid, monoesters or diesters of fumaric acid, monoesters or diesters of maleic acid, acrylonitrile, methacrylonitrile, acrylamide and methacrylamide, in a solvent selected from the group consisting of isopropanol and mixtures of isopropanol and water containing at least 40% by weight of isopropanol, in the presence of polymerization initiators, the improvement comprising carrying out the polymerization at a temperature of from 120° to 200° C. under a pressure of at least about 2 bars.

2. The process of claim 1, wherein the solvent is recovered and reused in a subsequent said polymerization.

3. The process of claim 1, wherein homopolymers of acrylic acid are produced.

4. The process of claim 1, wherein homopolymers of methacrylic acid are produced.

5. The process of claim 1 wherein the pressure is about 2 to 20 bar.

* * * * *